United States Patent
Chang et al.

(10) Patent No.: US 8,842,902 B2
(45) Date of Patent: Sep. 23, 2014

(54) SERVER AND METHOD FOR ALIGNING PART OF PRODUCT WITH REFERENCE OBJECT

(71) Applicants: Chih-Kuang Chang, New Taipei (TW); Xin-Yuan Wu, Shenzhen (CN); Wei Wang, Shenzhen (CN)

(72) Inventors: Chih-Kuang Chang, New Taipei (TW); Xin-Yuan Wu, Shenzhen (CN); Wei Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 53 days.

(21) Appl. No.: 13/659,992

(22) Filed: Oct. 25, 2012

(65) Prior Publication Data

US 2013/0108178 A1    May 2, 2013

(30) Foreign Application Priority Data

Oct. 31, 2011  (CN) .......................... 2011 1 0338265

(51) Int. Cl.
*G06K 9/00*      (2006.01)
(52) U.S. Cl.
USPC ........................... 382/151; 382/209; 382/289
(58) Field of Classification Search
USPC ......... 382/151, 209, 218, 284, 286, 289, 291, 382/294
See application file for complete search history.

(56) References Cited

U.S. PATENT DOCUMENTS

| | | | |
|---|---|---|---|
| 6,542,638 B2* | 4/2003 | Campbell | 382/201 |
| 6,876,946 B2* | 4/2005 | Yasuda et al. | 702/152 |
| 7,463,763 B2* | 12/2008 | Sano et al. | 382/144 |
| 7,809,181 B2* | 10/2010 | Yamashita | 382/151 |
| 7,885,483 B2* | 2/2011 | Yin | 382/294 |
| 8,254,723 B2* | 8/2012 | Chang et al. | 382/285 |
| 2001/0053245 A1* | 12/2001 | Sakai et al. | 382/151 |
| 2002/0154819 A1* | 10/2002 | Campbell | 382/209 |
| 2004/0254758 A1* | 12/2004 | Chang | 702/155 |
| 2005/0168460 A1* | 8/2005 | Razdan et al. | 345/419 |
| 2006/0165267 A1* | 7/2006 | Wyman et al. | 382/128 |
| 2009/0232388 A1* | 9/2009 | Minear et al. | 382/154 |
| 2012/0051665 A1* | 3/2012 | Adams et al. | 382/294 |
| 2012/0114202 A1* | 5/2012 | Manson | 382/128 |

\* cited by examiner

*Primary Examiner* — John Strege
(74) *Attorney, Agent, or Firm* — Novak Druce Connolly Bove + Quigg LLP (57) ABSTRACT

In a method for aligning a part of a product (moving object) with a reference object, triangle data of the moving object is acquired, and feature elements of the moving object is fitted according to the triangle data. Feature elements of the reference object which match the feature elements of the moving object are determined, and the moving object is moved from a position of a center point of the feature elements of the moving object to a position of a center point of the matched feature elements of the reference object. A moving-and-rotating matrix of the moving object is obtained according to Quasi-Newton methods, and the moving object and the reference object are aligned by moving and rotating the moving object according to the moving-and-rotating matrix.

15 Claims, 12 Drawing Sheets

SERVER AND METHOD FOR ALIGNING PART OF PRODUCT WITH REFERENCE OBJECT

BACKGROUND

1. Technical Field

Embodiments of the present disclosure generally relate to product measurement technology, and particularly to a server and a method for aligning a part of a product with a reference object.

2. Description of Related Arts

In automated processes, a product on a production line should be carefully measured. A computer can check feature elements of the product to ensure that quality of the product is within predetermined tolerances. During measurement of a part of a product, aligning the part of the product with a reference object is an important process. However, it is difficult to exactly and quickly align the part of the product and the reference object.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one".

In general, the word "module", as used herein, refers to logic embodied in hardware or firmware, or to a collection of software instructions, written in a programming language. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
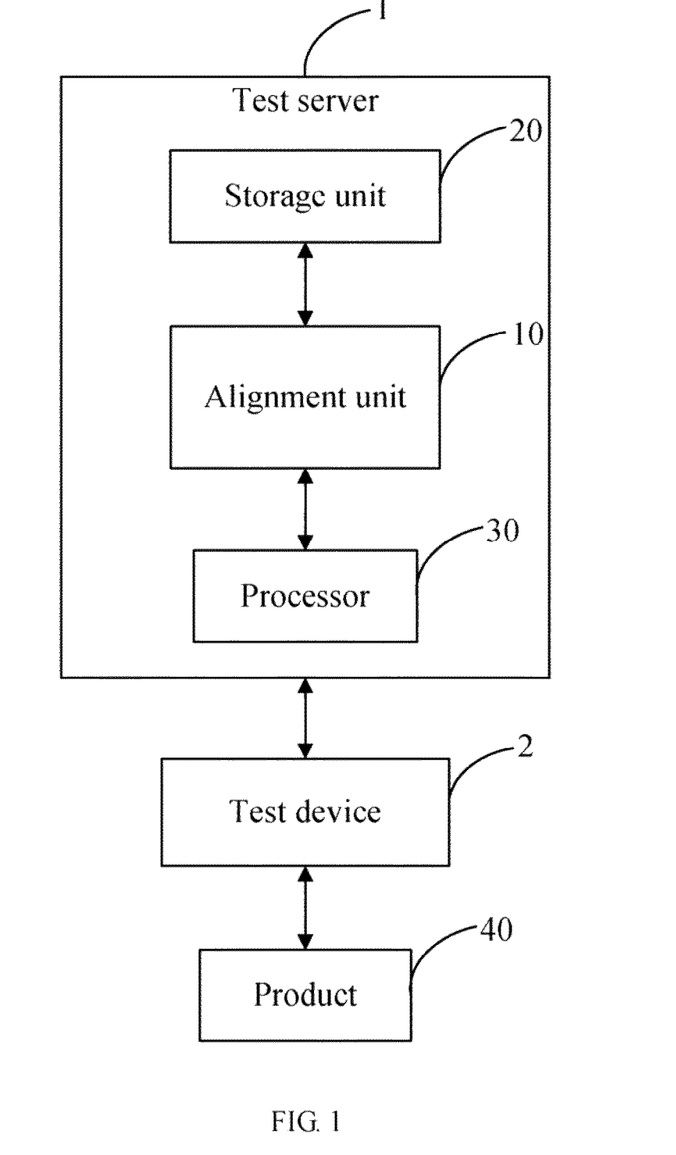
FIG. 1 is a schematic diagram of one embodiment of a test server.

FIG. 1 is a schematic diagram of one embodiment of a test server 1 (e.g., an electronic device). In the embodiment, the test server 1 includes an alignment unit 10, a storage unit 20, and a processor 30. The test server 1 is electrically connected to a test device 2. The test device 2 measures products, such as a product 40 (e.g., a mobile phone case), for example.

Figure 2:
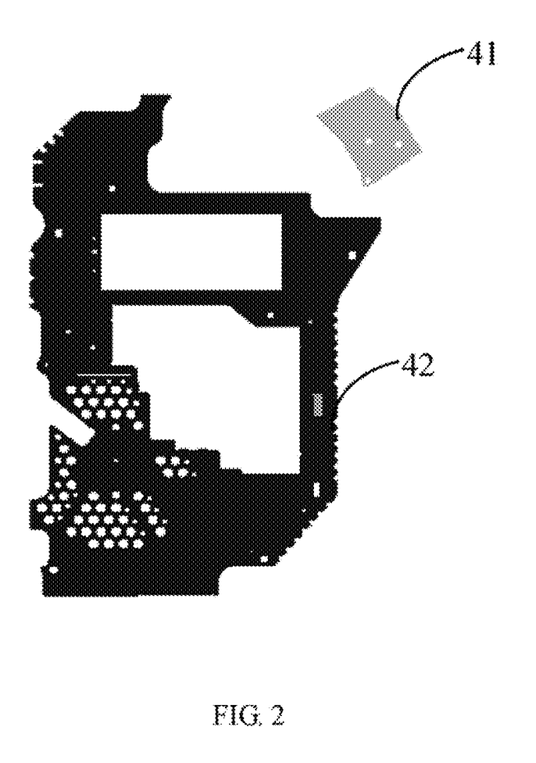
FIG. 2 is a schematic diagram of one embodiment of a movement object and a reference object.

The alignment unit 10 aligns a part of the product 40 (hereinafter, the part of the product 40 is referred as "moving object") with a corresponding part of reference object. The reference object is a three-dimensional design drawing of the product 40 or a scanned image of a sample of the product 40. The moving object is a scanned image of the part of the product 40. For example, in FIG. 2, an image in the upper right corner is the moving object 41, and an image on the left is the reference object 42.

Figure 3:
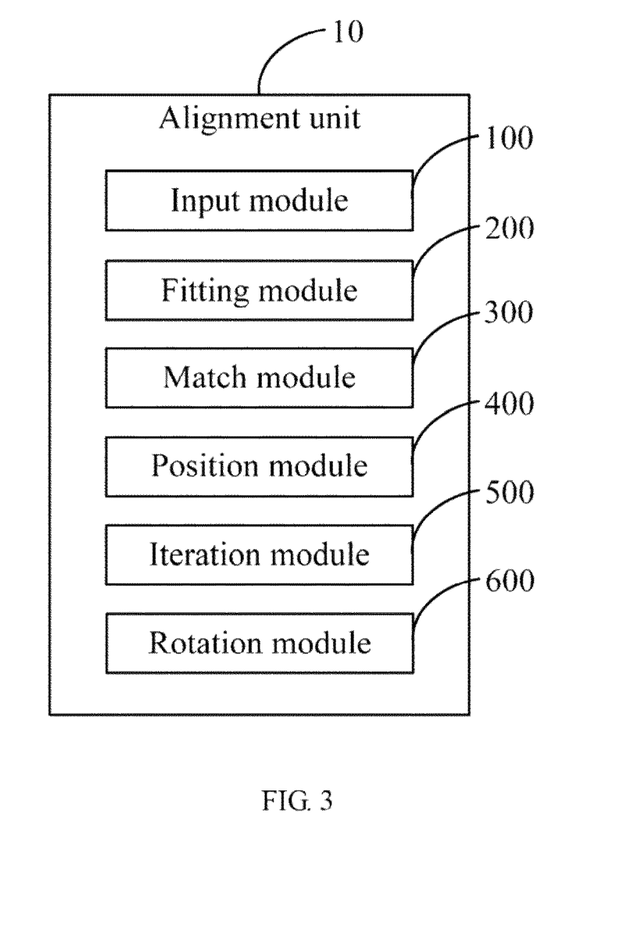
FIG. 3 is a block diagram of one embodiment of function modules of an alignment unit.

In one embodiment, the alignment unit 10 may include one or more function modules (as shown in FIG. 3). The one or more function modules may comprise computerized code in the form of one or more programs that are stored in the storage unit 20, and executed by the processor 30 to provide the functions of the alignment unit 10. The storage unit 20 is a dedicated memory, such as an EPROM or a flash memory.

FIG. 3 is a block diagram of one embodiment of the function modules of the alignment unit 10. In one embodiment, the alignment unit 10 includes an input module 100, a fitting module 200, a match module 300, a position module 400, an iteration module 500, and a rotation module 600. A detailed description of the functions of the modules 100-600 is given below in the description regarding FIG. 4.

Figure 4:
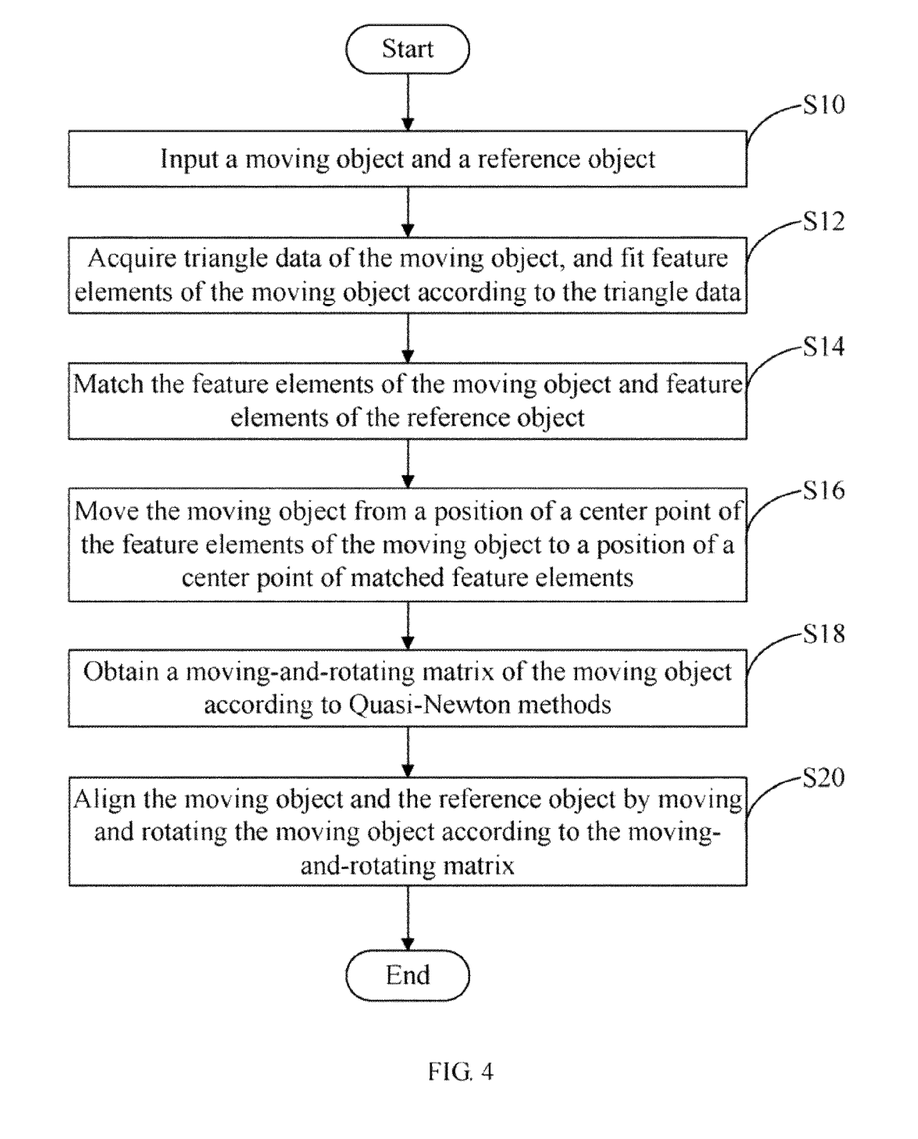
FIG. 4 is a flowchart of one embodiment of a method for aligning a part of a product with a reference object.

FIG. 4 is a flowchart of one embodiment of a method for aligning a part of a product with a reference object. Depending on the embodiment, additional steps may be added, others removed, and the ordering of the steps may be changed.

In step S10, the input module 100 inputs a moving object and a reference object. The input module 100 may read the moving object and the reference object from the storage unit 20, or receive the moving object from the test device 2 to input the moving object and the reference object.

Figure 5A:
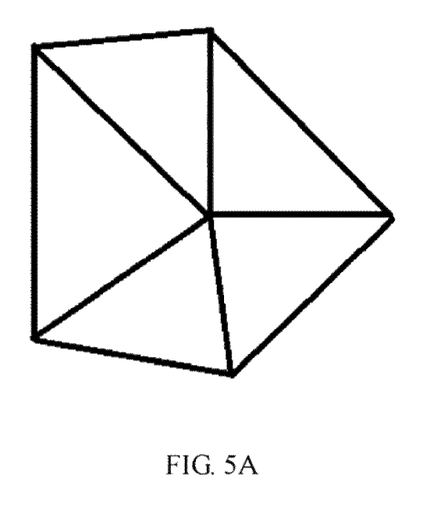
FIG. 5A is a schematic diagram of one embodiment of triangle data of the moving object.
Figure 5B:
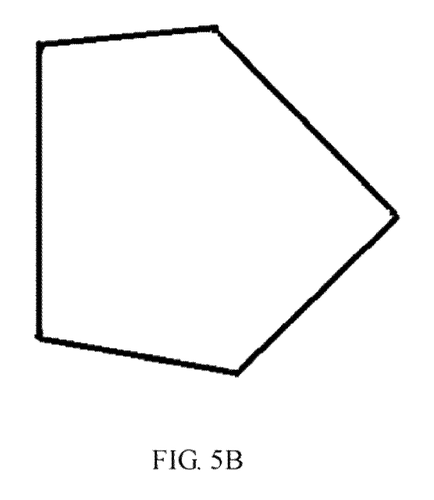
FIG. 5B is a schematic diagram of one embodiment of sides which are not shared by the triangles in FIG. 5A.

In step S12, the fitting module 200 acquires triangle data of the moving object (as shown in FIG. 5A), and fits feature elements of the moving object according to the triangle data. In detail, the fitting module 200 reads all of the triangle data and extracts sides of the triangles in the triangle data that are not shared by the triangles (as shown in FIG. 5B). Then, the fitting module 200 reads points of the extracted sides, and fits the points into the feature elements of the moving object.

In the embodiment, the triangle data is created according to point cloud data in the scanned image of the part of the product 40. The steps of creating the triangle data are as follow: constructs a cubical quad containing all the point cloud data; constructs a circumscribed tetrahedron around the cubical quad; inserts each point of the point cloud into the tetrahedron according to three-dimensional coordinates of each point, and draws a line to connect each point in the tetrahedron with each vertex of the tetrahedron.

Figure 6:
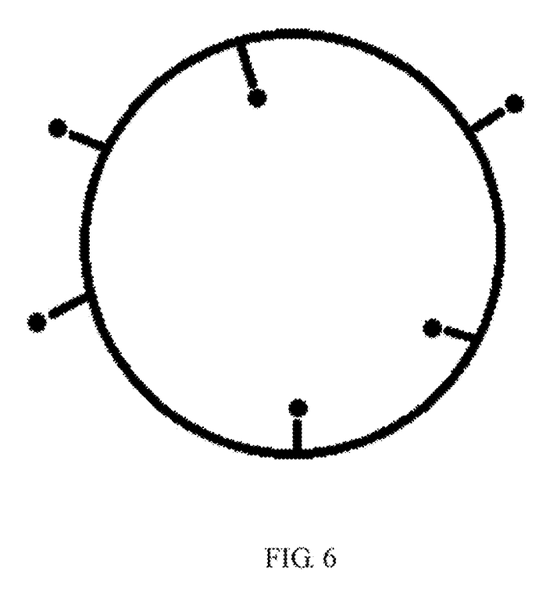
FIG. 6 is a schematic diagram of one embodiment of a reference figure.

In the embodiment, the points can be fitted into lines, planes, circles, columns, tapers, and spheres, for example. As shown in FIG. 6, if distances between the points and a reference figure (e.g., a reference circle) are less than a fitting tolerance, a figure fitted according to the points (e.g., a fitted circle) is the feature element of the moving object. It is understood that in other embodiments, the moving object may not be fitted into a fitted figure, the feature elements of the moving object are sides of the moving object.

In step S14, the match module 300 matches the feature elements of the moving object and feature elements of the reference object. In detail, the match module 300 reads a feature element list of the reference object from the storage unit 20, compares the feature elements of the moving object and the feature elements of the reference object, and extracts feature elements of the reference object which match with the feature elements of the moving object (hereinafter, the extracted feature elements are referred as "matched feature elements").

Figure 7:
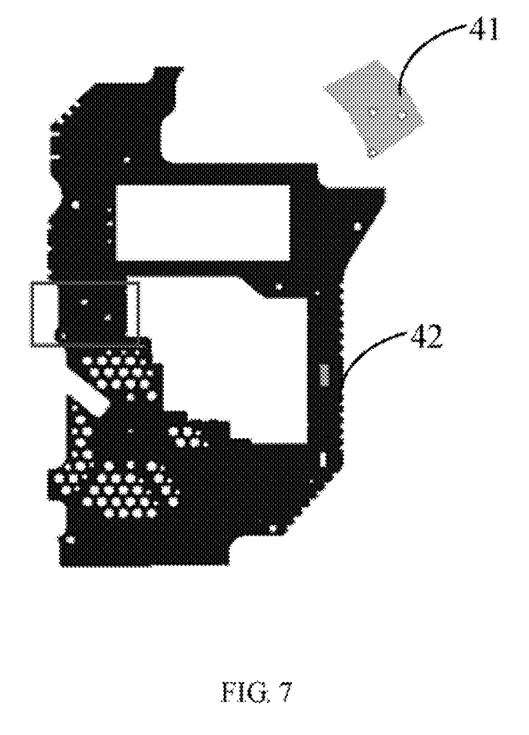
FIG. 7 is a schematic diagram of one embodiment of feature elements of the moving object and matching feature elements of the reference object.

For example, if the feature elements of the moving object and the feature elements of the reference object both contain three circles, such as if diameters of the three circles are 3 mm, 4 mm, and 4.5 mm, a distance between the 3 mm circle and the 4 mm circle is 8 mm, a distance between the 3 mm circle and the 4.5 mm circle is 9 mm, and a distance between the 4 mm circle and the 4.5 mm circle is 10 mm, the three circles of the reference object are regarded as matching with the three circles of the moving object. As shown in FIG. 7, there are three circles in the moving object 41, and also three circles in the reference object 42, which has the same sizes and position relations with the three circles in the moving object 41, so the three circles in the reference object 42 are regarded as matching with the three circles in the moving object 41.

In step S16, the position module 400 moves the moving object from a position of a center point of the feature elements of the moving object to a position of a center point of the matched feature elements. In detail, the position module 400 creates a first maximum space box for the feature elements of the moving object and a second maximum space box for the matched feature elements. The first maximum space box is created by determining a maximum coordinate value and a minimum coordinate value of the feature elements of the moving object in an x-axis, a y-axis, and a z-axis of a coordinate system. The second maximum space box is created by determining a maximum coordinate value and a minimum coordinate value of the matched feature elements in the x-axis, the y-axis, and the z-axis of the coordinate system.

In one embodiment, a function of the first maximum space box is: boxMov(pt1Min.x, pt1Min.y, pt1Min.z, pt1Max.x, pt1Max.y, pt1Max.z), where pt1Min.x, pt1Min.y, pt1Min.z represent the minimum x, y, z coordinate values of the feature elements of the moving object, and pt1Max.x, pt1Max.y, pt1Max.z represent the maximum x, y, z coordinate values of the feature elements of the moving object.

A function of the second maximum space box is: boxRef (pt2Min.x, pt2Min.y, pt2Min.z, pt2Max.x, pt2Max.y, pt2Max.z), where pt2Min.x, pt2Min.y, pt2Min.z represent the minimum x, y, z coordinate values of the matched feature elements, and pt2Max.x, pt2Max.y, pt2Max.z represent the maximum x, y, z coordinate values of the matched feature elements.

Figure 8:
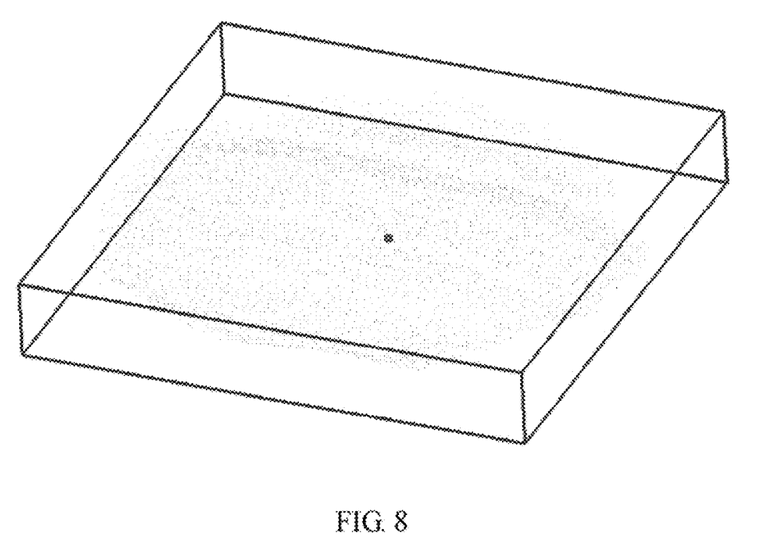
FIG. 8 is a schematic diagram of one embodiment of a maximum space box and a center point of the maximum space box.

The position module 400 calculates an initial iteration parameter, obtains an initial moving matrix of the moving object, and moves the moving object from the position of the center point of the feature elements of the moving object to the position of the center point of the matched feature elements, according to the initial moving matrix. The initial iteration parameter is calculated according to positions of a center point of the first maximum space box and a center point of the second maximum space box. As shown in FIG. 8, the cuboid is the first maximum space box for the feature elements of the moving object, and the point in the center of the cuboid is the center point of the first maximum space box.

The initial iteration parameter is an array which contains P[0]-P[5] as follows:

P[0]=CenMov[0]-CenRef[0], where CenMov[0] is a coordinate value of the center point of the first maximum space box in the x-axis, CenRef[0] is a coordinate value of the center point of the second maximum space box in the x-axis;

P[1]=CenMov[1]-CenRef[1], where CenMov[1] is a coordinate value of the center point of the first maximum space box in the y-axis, CenRef[1] is a coordinate value of the center point of the second maximum space box in the y-axis;

P[2]=CenMov[2]-CenRef[2], where CenMov[2] is a coordinate value of the center point of the first maximum space box in the z-axis, CenRef[2] is a coordinate value of the center point of the second maximum space box in the z-axis;

P[3], which is an angle of the x-axis with a line of the center point of the first maximum space box and the center point of the second maximum space box;

P[4], which is an angle of the y-axis with a line of the center point of the first maximum space box and the center point of the second maximum space box; and P[5], which is an angle of the z-axis with a line of the center point of the first maximum space box and the center point of the second maximum space box.

Figure 9:
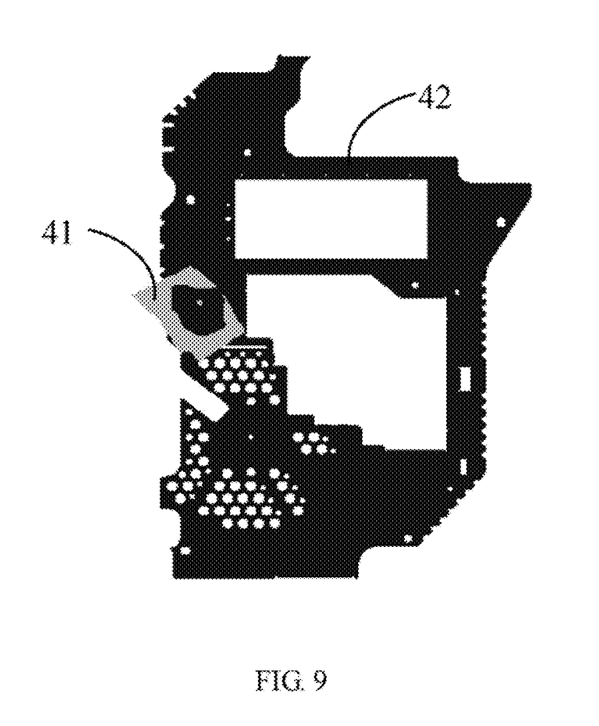
FIG. 9 is a schematic diagram of one embodiment of the moving object after moving according to an initial moving matrix.

P[0], P[1], and P[2] make up the initial moving matrix of the moving object. As shown in FIG. 9, the moving object 41 is moved according to the initial moving matrix.

In step S18, the iteration module 500 obtains a moving-and-rotating matrix of the moving object according to Quasi-Newton methods. A detailed description is given below in the description regarding FIG. 11.

Figure 10:
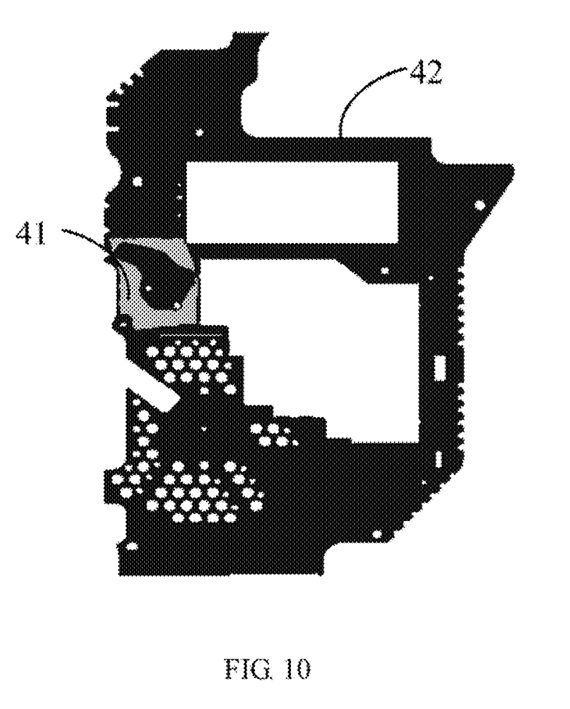
FIG. 10 is a schematic diagram of one embodiment of the moving object and the reference object after aligning.

In step S20, the rotation module 600 aligns the moving object and the reference object by moving and rotating the moving object according to the moving-and-rotating matrix. As shown in FIG. 10, the moving object 41 and the reference object 42 are aligned.

Figure 11:
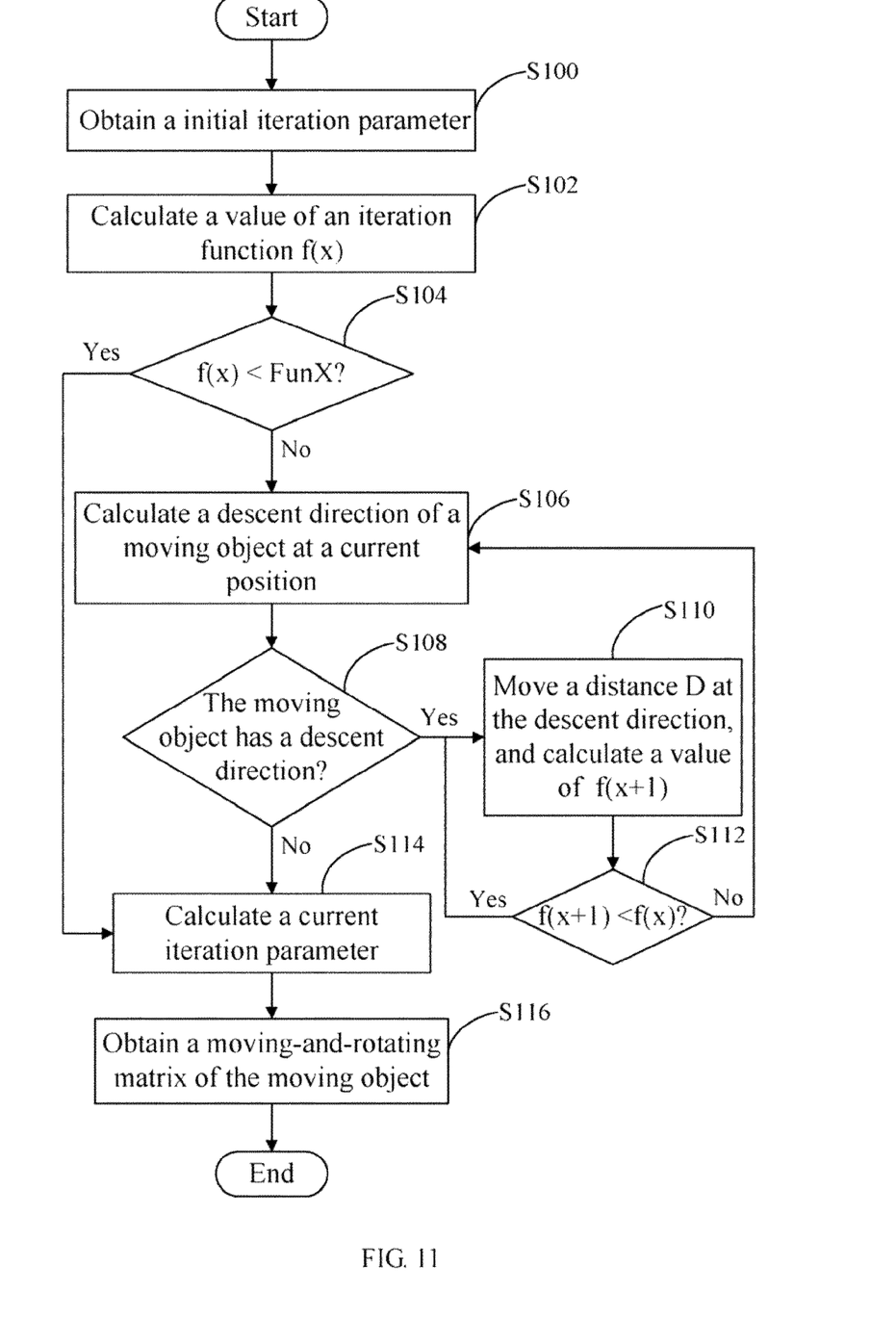
FIG. 11 is a flowchart detailing one embodiment of step S18 in FIG. 4.

FIG. 11 is a flowchart detailing one embodiment of step S18 in FIG. 4.

In step S100, the iteration module 500 obtains the initial iteration parameter.

In step S102, the iteration module 500 calculates a value of an iteration function f(x):

$$f(x) = \sqrt{\frac{\sum_{i=1}^{n} \left(\sqrt{(X_2 - X_1)^2 + (Y_2 - Y_1)^2 + (Z_2 - Z_1)^2}\right)^2}{n}},$$

where n is a total number of the points in the feature elements of the moving object; $X_2$, $Y_2$, and $Z_2$ are current coordinate values of the points in the feature elements of the moving object in the x-axis, the y-axis, and the z-axis; $X_1$, $Y_1$, and $Z_1$ are coordinate values of points in the matched feature elements of the reference object in the x-axis, the y-axis, and the z-axis.

In step S104, the iteration module 500 determines whether the value of the iteration function f(x) is less than a preset minimum value FunX. If the value of the iteration function f(x) is less than FunX, step S114 is implemented. If the value of the iteration function f(x) is not less than FunX, step S106 is implemented.

In step S106, the iteration module 500 calculates a descent direction of the moving object at a current position. In detail, if the value of f(x) after the moving object moving a step (e.g., a preset distance D) at a direction is less than the value of f(x) before the movement, the direction is the descent direction of the moving object at the current position, then the moving object moves a next step at the direction. If the value of f(x)

after the moving object moving a step at a direction is not less than the value of f(x) before the movement, the direction is not the descent direction of the moving object at the current position, then the moving object moves a next step at another direction.

In step S108, the iteration module 500 determines whether the moving object has a descent direction. If the moving object has the descent direction, step S110 is implemented. If the moving object has no descent direction, step S114 is implemented.

In step S110, the iteration module 500 moves the moving object with the distance D at the descent direction, and calculates a value of an iteration function f(x+1) after the movement.

In step S112, the iteration module 500 determines whether the value of f(x+1) is less than the value of f(x). If the value of f(x+1) is less than the value of f(x), returns to step S110. If the value of f(x+1) is less than the value of f(x), returns to step S106, and calculates a new descent direction of the moving object.

In step S114, the iteration module 500 calculates a current iteration parameter. The current iteration parameter is an array which contains Para[0]-Para[5] as follows:

Para[0], a distance between each point in the feature elements of the moving object at current position and the x-axis;

Para[1], a distance between each point in the feature elements of the moving object at current position and the y-axis;

Para[2], a distance between each point in the feature elements of the moving object at current position and the z-axis;

Para[3], an angle of the x-axis with a line of each point in the feature elements of the moving object at current position and corresponding point in the matched feature elements of the reference object;

Para[4], an angle of the y-axis with a line of each point in the feature elements of the moving object at current position and corresponding point in the matched feature elements of the reference object; and Para[5], an angle of the z-axis with a line of each point in the feature elements of the moving object at current position and corresponding point in the matched feature elements of the reference object.

In step S116, the iteration module 500 obtains the moving-and-rotating matrix "Matrix" of the moving object. Matrix=Move*(Move2*(Mat*moveX1)), where:

$$Mat = Move1 * MatX * MatY * MatZ,$$

$$Move = \begin{pmatrix} 1 & 0 & 0 & Para[0] \\ 0 & 1 & 0 & Para[1] \\ 0 & 0 & 1 & Para[2] \\ 0 & 0 & 0 & 1 \end{pmatrix},$$

$$Move2 = \begin{pmatrix} 1 & 0 & 0 & -Center[0] \\ 0 & 1 & 0 & -Center[1] \\ 0 & 0 & 1 & -Center[2] \\ 0 & 0 & 0 & 1 \end{pmatrix},$$

$$moveX1 = \begin{pmatrix} X_1 \\ Y_1 \\ Z_1 \\ 1 \end{pmatrix},$$

$$Move1 = \begin{pmatrix} 1 & 0 & 0 & Center[0] \\ 0 & 1 & 0 & Center[1] \\ 0 & 0 & 1 & Center[2] \\ 0 & 0 & 0 & 1 \end{pmatrix},$$

$$MatX = \begin{pmatrix} 1 & 0 & 0 & 0 \\ 0 & \cos(angleX) & -\sin(angleX) & 0 \\ 0 & \sin(angleX) & \cos(angleX) & 0 \\ 0 & 0 & 0 & 1 \end{pmatrix},$$

$$MatY = \begin{pmatrix} \cos(angleY) & 0 & \sin(angleY) & 0 \\ 0 & 1 & 0 & 0 \\ -\sin(angleY) & 0 & \cos(angleY) & 0 \\ 0 & 0 & 0 & 1 \end{pmatrix},$$

$$MatZ = \begin{pmatrix} \cos(angleZ) & -\sin(angleZ) & 0 & 0 \\ \sin(angleZ) & \cos(angleZ) & 0 & 0 \\ 0 & 0 & 1 & 0 \\ 0 & 0 & 0 & 1 \end{pmatrix};$$

and

Center[0], Center[1], and Center[2] are coordinate values of a current center point of the feature elements of the moving object in the x-axis, the y-axis, and the z-axis; angleX=Para[3]*π/180, angleY=Para[4]*π/180, and angleZ=Para[5]*π/180, where it is circumference ratio.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method being executed by a processor of an electronic device, the method comprising:
    (a) inputting a moving object and a reference object;
    (b) acquiring triangle data of the moving object, and fitting feature elements of the moving object according to the triangle data;
    (c) matching the feature elements of the moving object and feature elements of the reference object;
    (d) moving the moving object from a position of a center point of the feature elements of the moving object to a position of a center point of the matching feature elements of the reference object;
    (e) obtaining a moving-and-rotating matrix of the moving object according to Quasi-Newton methods; and
    (f) aligning the moving object and the reference object by moving and rotating the moving object according to the moving-and-rotating matrix.

2. The method as claimed in claim 1, wherein step (b) further comprises:
    extracting sides of triangles in the triangle data that are not shared by the triangles in the triangle data;
    reading points of the extracted sides; and
    fitting the points into the feature elements of the moving object.

3. The method as claimed in claim 1, wherein step (c) further comprises:
    reading a feature element list of the reference object from a storage unit of the electronic device;
    comparing the feature elements of the moving object and the feature elements of the reference object; and extracting feature elements of the reference object which
match with the feature elements of the moving object
according to the comparison.

4. The method as claimed in claim 1, wherein step (d) further comprises:
creating a first maximum space box for the feature elements of the moving object and a second maximum space box for the matched feature elements of the reference object;
calculating an initial iteration parameter according to positions of a center point of the first maximum space box and a center point of the second maximum space box;
obtaining an initial moving matrix of the moving object; and
moving the moving object from the position of the center point of the feature elements of the moving object to the position of the center point of the matching feature elements of the reference object, according to the initial moving matrix.

5. The method as claimed in claim 1, wherein step (e) further comprises:
obtaining the initial iteration parameter;
calculating a value of an iteration function f(x);
calculating a descent direction of the moving object at a current position, in response that the value of the iteration function f(x) is not less than a preset minimum value FunX;
moving the moving object with a distance D at the descent direction, and calculating a value of an iteration function f(x+1) after the movement, in response that the moving object has the descent direction;
continuing to move the moving object with the distance D at the descent direction in response that the value of f(x+1) is less than the value of f(x), or calculating a new descent direction of the moving object in response that the value of f(x+1) is not less than the value of f(x);
calculating a current iteration parameter in response that the value of the iteration function f(x) is less than FunX, or the moving object has no descent direction; and
obtaining the moving-and-rotating matrix of the moving object.

6. A non-transitory storage medium storing a set of instructions, the set of instructions being executed by a processor of an electronic device, to perform a method comprising:
(a) inputting a moving object and a reference object;
(b) acquiring triangle data of the moving object, and fitting feature elements of the moving object according to the triangle data;
(c) determining feature elements of the reference object which match the feature elements of the moving object;
(d) moving the moving object from a position of a center point of the feature elements of the moving object to a position of a center point of the matched feature elements of the reference object;
(e) obtaining a moving-and-rotating matrix of the moving object according to Quasi-Newton methods; and
(f) aligning the moving object and the reference object by moving and rotating the moving object according to the moving-and-rotating matrix.

7. The non-transitory storage medium as claimed in claim 6, wherein step (b) further comprises:
extracting sides of triangles in the triangle data that are not shared by the triangles in the triangle data;
reading points of the extracted sides; and
fitting the points into the feature elements of the moving object.

8. The non-transitory storage medium as claimed in claim 6, wherein step (c) further comprises:
reading a feature element list of the reference object from a storage unit of the electronic device;
comparing the feature elements of the moving object and the feature elements of the reference object; and
extracting feature elements of the reference object which match with the feature elements of the moving object according to the comparison.

9. The non-transitory storage medium as claimed in claim 6, wherein step (d) further comprises:
creating a first maximum space box for the feature elements of the moving object and a second maximum space box for the matched feature elements of the reference object;
calculating an initial iteration parameter according to positions of a center point of the first maximum space box and a center point of the second maximum space box;
obtaining an initial moving matrix of the moving object; and
moving the moving object from the position of the center point of the feature elements of the moving object to the position of the center point of the matching feature elements of the reference object, according to the initial moving matrix.

10. The non-transitory storage medium as claimed in claim 6, wherein step (e) further comprises:
obtaining the initial iteration parameter;
calculating a value of an iteration function f(x);
calculating a descent direction of the moving object at a current position, in response that the value of the iteration function f(x) is not less than a preset minimum value FunX;
moving the moving object with a distance D at the descent direction, and calculating a value of an iteration function f(x+1) after the movement, in response that the moving object has the descent direction;
continuing to move the moving object with the distance D at the descent direction in response that the value of f(x+1) is less than the value of f(x), or calculating a new descent direction of the moving object in response that the value of f(x+1) is not less than the value of f(x);
calculating a current iteration parameter in response that the value of the iteration function f(x) is less than FunX, or the moving object has no descent direction; and
obtaining the moving-and-rotating matrix of the moving object.

11. An electronic device electrically connected to a test device, the electronic device comprising:
a storage unit;
at least one processor;
one or more programs that are stored in the storage unit and are executed by the at least one processor, the one or more programs comprising:
an input module that inputs a moving object and a reference object;
a fitting module that acquires triangle data of the moving object, and fits feature elements of the moving object according to the triangle data;
a match module that determines feature elements of the reference object which match the feature elements of the moving object;
a position module that moves the moving object from a position of a center point of the feature elements of the moving object to a position of a center point of the matched feature elements of the reference object;

an iteration module that obtains a moving-and-rotating matrix of the moving object according to Quasi-Newton methods; and a rotation module that aligns the moving object and the reference object by moving and rotating the moving object according to the moving-and-rotating matrix.

12. The electronic device as claimed in claim 11, wherein the fitting module further:

extracts sides of triangles in the triangle data that are not shared by the triangles in the triangle data;

reads points of the extracted sides; and fits the points into the feature elements of the moving object.

13. The electronic device as claimed in claim 11, wherein the match module further:

reads a feature element list of the reference object from the storage unit;

compares the feature elements of the moving object and the feature elements of the reference object; and extracts feature elements of the reference object which match with the feature elements of the moving object according to the comparison.

14. The electronic device as claimed in claim 11, wherein the position module further:

creates a first maximum space box for the feature elements of the moving object and a second maximum space box for the matched feature elements of the reference object;

calculates an initial iteration parameter according to positions of a center point of the first maximum space box and a center point of the second maximum space box;

obtains an initial moving matrix of the moving object; and moves the moving object from the position of the center point of the feature elements of the moving object to the position of the center point of the matching feature elements of the reference object, according to the initial moving matrix.

15. The electronic device as claimed in claim 11, wherein the iteration module further:

obtains the initial iteration parameter;

calculates a value of an iteration function $f(x)$;

calculates a descent direction of the moving object at a current position, in response that the value of the iteration function $f(x)$ is not less than a preset minimum value FunX;

moves the moving object with a distance D at the descent direction, and calculates a value of an iteration function $f(x+1)$ after the movement, in response that the moving object has the descent direction;

continues to move the moving object with the distance D at the descent direction in response that the value of $f(x+1)$ is less than the value of $f(x)$, or calculates a new descent direction of the moving object in response that the value of $f(x+1)$ is not less than the value of $f(x)$;

calculates a current iteration parameter in response that the value of the iteration function $f(x)$ is less than FunX, or the moving object has no descent direction; and obtains the moving- and rotating-matrix of the moving object.

* * * * *